(12) United States Patent
Momtaz et al.

(10) Patent No.: US 12,260,354 B2
(45) Date of Patent: Mar. 25, 2025

(54) METHODS FOR MANAGING WORKSPACE RESERVATIONS BASED ON USER LOCATION MAPPING AND DEVICES THEREOF

(71) Applicant: JONES LANG LASALLE IP, INC., Chicago, IL (US)

(72) Inventors: Kourosh Sadr Momtaz, Richmond (GB); Laura Tedoldi, Paris (FR); Yu-Chun Tsai, San Jose, CA (US); Samantha Akomeah, London (GB)

(73) Assignee: JONES LANG LASALLE IP, INC., Chicago, IL (US)

( * ) Notice: Subject to any disclaimer, the term of this patent is extended or adjusted under 35 U.S.C. 154(b) by 0 days.

(21) Appl. No.: 17/900,463

(22) Filed: Aug. 31, 2022

(65) Prior Publication Data
US 2024/0070558 A1 Feb. 29, 2024

(51) Int. Cl.
*G06Q 10/02* (2012.01)
*G06Q 10/1093* (2023.01)

(52) U.S. Cl.
CPC ......... *G06Q 10/02* (2013.01); *G06Q 10/1093* (2013.01)

(58) Field of Classification Search
CPC .................. G06Q 10/02; G06Q 10/1093
USPC .......................................................... 705/5
See application file for complete search history.

(56) References Cited

U.S. PATENT DOCUMENTS

| 2008/0114840 A1* | 5/2008 | Rollin | G06Q 10/109 707/999.102 |
| 2014/0280053 A1* | 9/2014 | Derks | G06F 16/9537 707/722 |
| 2015/0039357 A1* | 2/2015 | Segal | G06Q 10/06314 705/5 |

(Continued)

FOREIGN PATENT DOCUMENTS

WO WO-2016108108 A1 * 7/2016

OTHER PUBLICATIONS

Dynamic allocation of meeting rooms for multiple participants based on a combination of different attributes, The IP.com Journal, Dec. 11, 2013. pp. 1-2. https://priorart.ip.com/IPCOM/000233367. (Year: 2013).*

*Primary Examiner* — Jeff Zimmerman
*Assistant Examiner* — Hunter A Molnar
(74) *Attorney, Agent, or Firm* — TROUTMAN PEPPER LOCKE LLP

(57) ABSTRACT

Methods, non-transitory computer readable media, and reservation management devices are disclosed that obtain workspace parameter(s) from a client device after authenticating a user of the client device. User geolocations are determined for the authenticated user and registered user(s) identified by the authenticated user. Workspaces are filtered based on a correlation of the user geolocations and workspace geolocations for the workspaces to identify a subset of the workspaces. The workspaces are determined to satisfy the workspace parameter(s) based on workspace data for the workspaces. A selection of one of the subset of the workspaces is received from the authenticated user. Availability data for the one of the subset of the workspaces is updated based on a time window input by the authenticated user. A digital calendar invitation is then generated and provided to (Continued)

the client device and/or other client device(s) associated with one or more of the registered user(s).

15 Claims, 10 Drawing Sheets

(56) References Cited

U.S. PATENT DOCUMENTS

2023/0186247 A1* 6/2023 Kenyon ................. G06N 5/022
 705/7.19

* cited by examiner

FIG. 9

METHODS FOR MANAGING WORKSPACE RESERVATIONS BASED ON USER LOCATION MAPPING AND DEVICES THEREOF

FIELD

This technology generally relates to workspace reservation management systems and digital platforms and, more particularly, to methods and devices for managing physical workspace reservations based on geolocations of available workspaces and obtained and correlated current user geolocations.

BACKGROUND

Employees and other workers are increasingly performing many job functions remotely while some tasks still require, or would be more efficient or effective as, an in-person collaboration. The advent of significant remote work has resulted in unused, or under-utilized, private conference rooms and other types of physical workspaces. Commercial real estate property owners and managers may want to monetize such under-utilized workspaces. Conversely, many workers may want to host meetings with coworkers, or prospective customers or clients, but their employer does not have a suitable physical workspace, or has reduced their physical footprint, within a particular geographic area. Even where workspaces are made available to coworkers (e.g., by their common employer), a meeting host may find it more desirable to host a meeting at a location more convenient for remote coworkers attending the meeting.

For example, one remote coworker may determine relatively spontaneously that a brainstorming session would be more effective in-person with five other remote coworkers, but the prospective meeting host and the particular five remote coworkers have relatively long commutes or travel times to a conference room at the headquarters of their common employer. In this scenario, it would be desirable for the meeting host to reserve a private conference room (e.g., at a cost to be paid by their employer) at a location more convenient than the company headquarters for the meeting attendees, which would reduce travel time. The reduced travel time would benefit their employer via reduced lost productivity and the off-site meeting would facilitate increased flexibility with the employer's on-site conference workspaces. For example, the employer could monetize the on-site workspace by making it available to a third party.

However, a marketplace for matching meeting hosts with available physical workspaces (e.g., for relatively short-term utilization) does not exist, let alone a marketplace that operates effectively to facilitate workspace reservations in optimal physical locations. In the scenario described above, there is no currently no convenient way to identify a workspace available for reservation in a location that is optimal or relatively convenient for all meeting attendees. Conversely, commercial property owners and managers have limited flexibility with respect to physical space, and are currently unable to monetize under-utilized physical workspaces.

SUMMARY

A method for managing workspace reservations is disclosed that is implemented by one or more reservation management devices and includes obtaining one or more workspace parameters from a client device after authenticating a user of the client device. User geolocations are determined for the authenticated user and one or more registered users identified by the authenticated user. A plurality of workspaces is filtered based on a correlation of the user geolocations and stored workspace geolocations for the workspaces to identify a subset of the workspaces. The workspaces are determined to satisfy at least a subset of the workspace parameters based on stored workspace data for the workspaces. A selection of one of the subset of the workspaces is received from the authenticated user. Stored availability data for the one of the subset of the workspaces is updated based on a time window input by the authenticated user. A digital calendar invitation is generated and provided to one or more of the client device or one or more other client devices associated with one or more of the registered users.

An reservation management device is disclosed that includes memory including programmed instructions stored thereon and one or more processors configured to execute the stored programmed instructions to obtain one or more workspace parameters from a client device after authenticating a user of the client device. User geolocations are determined for the authenticated user and one or more registered users identified by the authenticated user. A plurality of workspaces is filtered based on a correlation of the user geolocations and stored workspace geolocations for the workspaces to identify a subset of the workspaces. The workspaces are determined to satisfy at least a subset of the workspace parameters based on stored workspace data for the workspaces. A selection of one of the subset of the workspaces is received from the authenticated user. Stored availability data for the one of the subset of the workspaces is updated based on a time window input by the authenticated user. A digital calendar invitation is generated and provided to one or more of the client device or one or more other client devices associated with one or more of the registered users.

A non-transitory computer readable medium having stored thereon instructions for managing workspace reservations is disclosed that includes executable code that, when executed by one or more processors, causes the one or more processors to obtain one or more workspace parameters from a client device after authenticating a user of the client device. User geolocations are determined for the authenticated user and one or more registered users identified by the authenticated user. A plurality of workspaces is filtered based on a correlation of the user geolocations and stored workspace geolocations for the workspaces to identify a subset of the workspaces. The workspaces are determined to satisfy at least a subset of the workspace parameters based on stored workspace data for the workspaces. A selection of one of the subset of the workspaces is received from the authenticated user. Stored availability data for the one of the subset of the workspaces is updated based on a time window input by the authenticated user. A digital calendar invitation is generated and provided to one or more of the client device or one or more other client devices associated with one or more of the registered users.

This technology provides a number of advantages including methods, non-transitory computer readable media, and reservation management devices that advantageously obtain and correlate current geolocations for users of client devices associated with prospective attendees of a meeting, along with obtained and stored geolocations for workspaces, to facilitate reservation of one of the workspaces at which the meeting can be hosted. This technology obtains and stores workspace data, such as geolocation, size, amenities, cost, and/or availability, and uses the workspace data to suggest workspaces to a meeting host.

The workspaces are suggested based satisfaction of specified parameters as well as a geographic area determined by pinging mobile devices associated with attendees of the meeting. The reservation management device of this technology can then update availability data for a selected workspace to reflect the reservation and facilitate invitation to digital calendars of meeting attendees, among other advantages.

BRIEF DESCRIPTION OF THE DRAWINGS

FIG. 9 is an exemplary reservation interface; and

DETAILED DESCRIPTION

Figure 1:
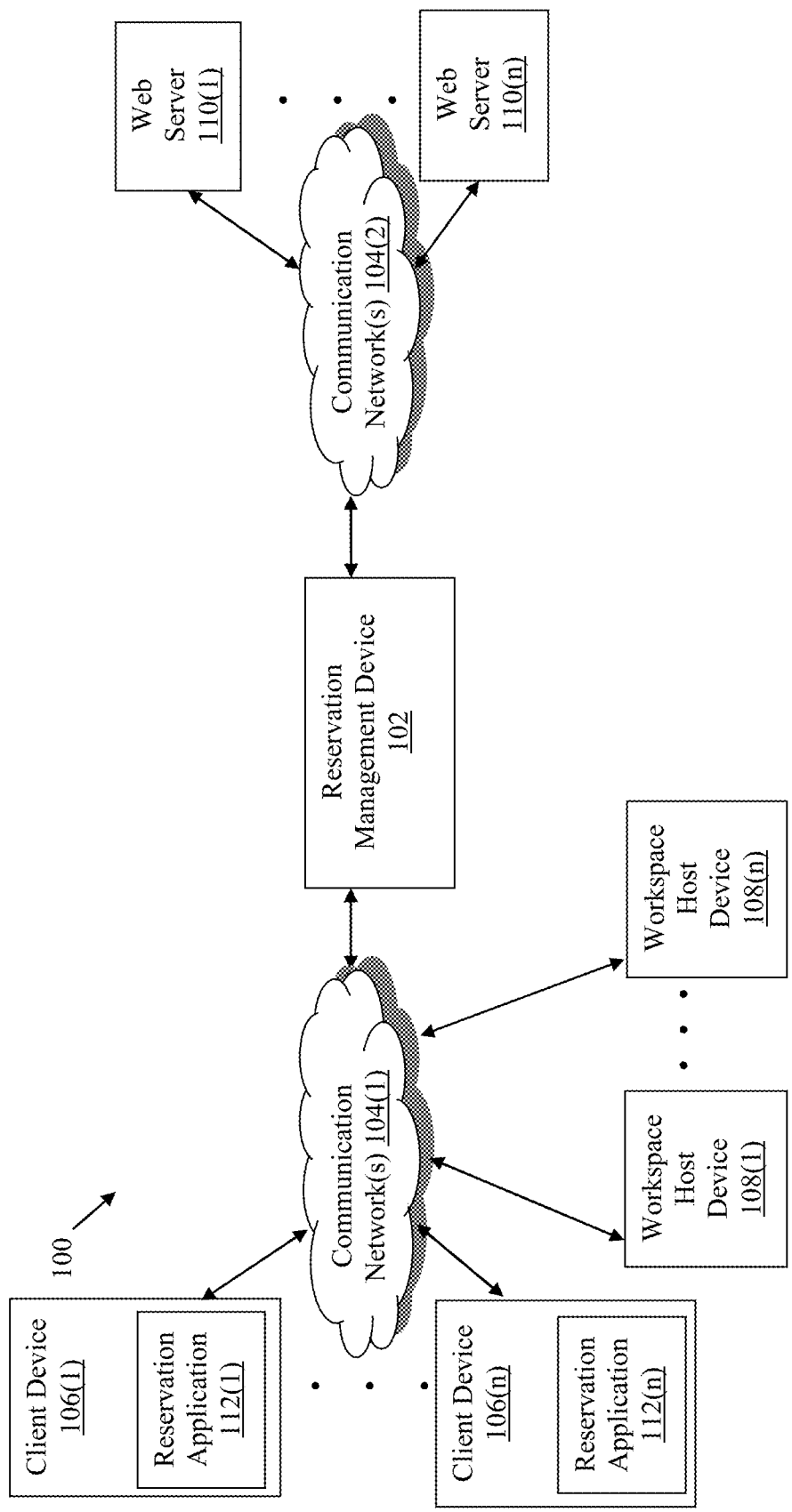
FIG. 1 is a block diagram of an exemplary network environment with a reservation management device.

Referring to FIG. 1, an exemplary network environment 100 is illustrated that includes a reservation management device 102 coupled, via communication network(s) 104(1), to client devices 106(1)-106(n) and workspace host devices 108(1)-108(n) and, via communication network(s) 104(2), web servers 110(1)-110(n). The network environment 100 may include other network devices such as one or more routers or switches, for example, which are known in the art and thus will not be described herein. This technology provides a number of advantages including methods, non-transitory computer readable media, and reservation management devices that efficiently analyze user and available workspace geolocations to facilitate workspace reservations to allow meetings to occur at more convenient locations, thereby reducing travel time, improving collaboration, and optimizing physical workspace utilization. The term "meeting" as used herein includes any type of event that includes multiple people.

In this particular example, the client devices 106(1)-106(n), workspace host devices 108(1)-108(n), reservation management device 102, and web servers 110(1)-110(n) are disclosed in FIG. 1 as dedicated hardware devices. However, one or more of the client devices 106(1)-106(n), workspace host devices 108(1)-108(n), reservation management device 102, or web servers 110(1)-110(n) can also be implemented in software within one or more other devices in the network environment 100. As one example, the reservation management device 102, as well as any of its components or applications, can be implemented as software executing on one of the web servers 110(1)-110(n), and many other permutations and types of implementations and network topologies can also be used in other examples.

Figure 2:
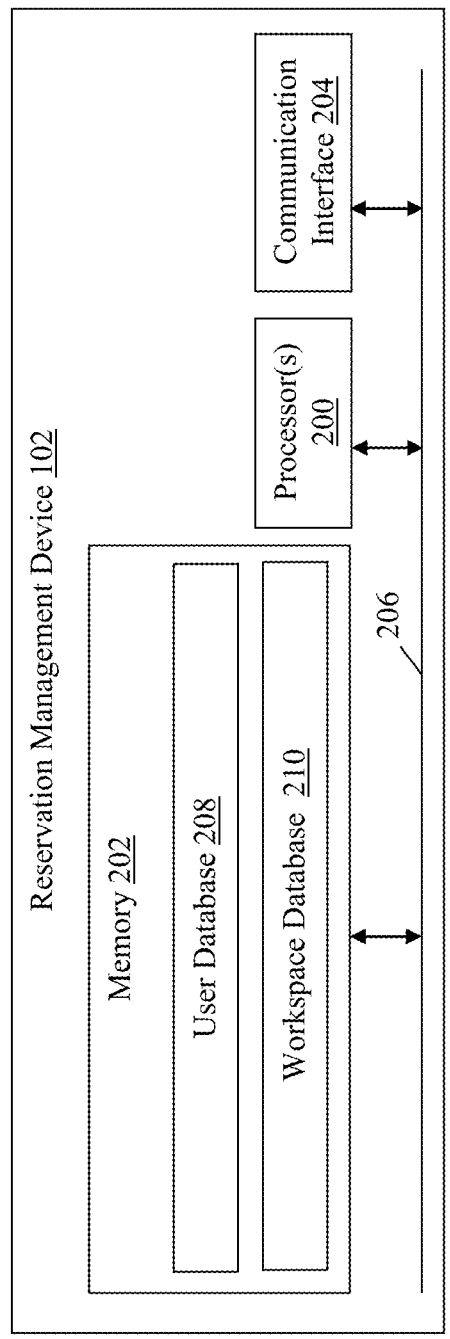
FIG. 2 is a block diagram of an exemplary reservation management device.

Referring to FIGS. 1-2, the reservation management device 102 of the network environment 100 may perform any number of functions, including providing graphical user interfaces (GUIs) to the client devices 106(1)-106(n) and workspace host devices 108(1)-108(n) and communicating with the web servers 110(1)-110(n) to facilitate workspace reservations. The reservation management device 102 in this example includes one or more processor(s) 200, a memory 202, and a communication interface 204, which are coupled together by a bus 206, although the reservation management device 102 can include other types or numbers of elements in other configurations.

Figure 3:
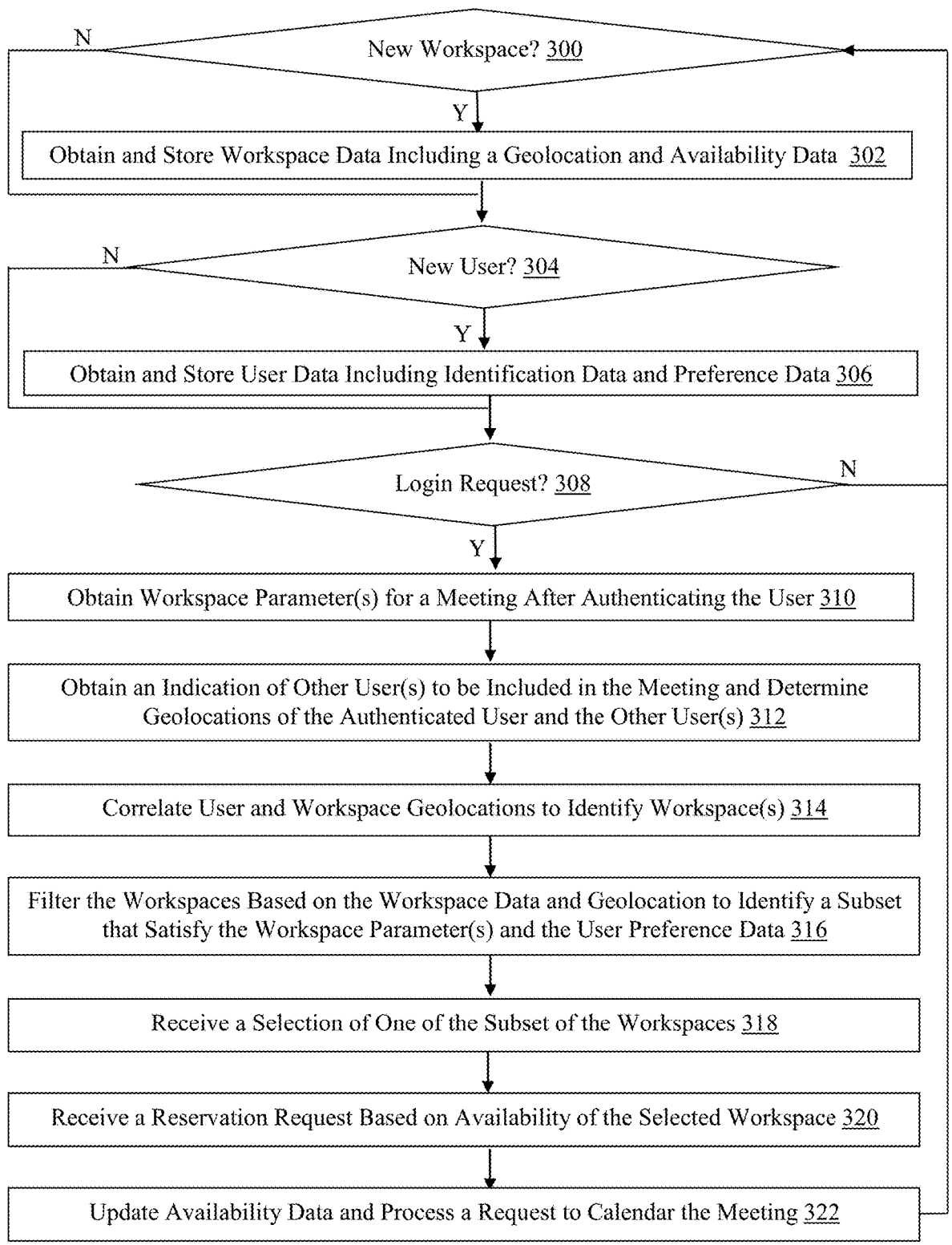
FIG. 3 is a flowchart of an exemplary method for managing workspace reservations.

The processor(s) 200 of the reservation management device 102 may execute programmed instructions stored in the memory 202 of the reservation management device 102 for any number of the functions described and illustrated herein (e.g., with reference to FIG. 3). The processor(s) 200 may include one or more central processing units (CPUs) or general purpose processors with one or more processing cores, for example, although other types of processor(s) can also be used.

The memory 202 of the reservation management device 102 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the reservation management device 102, cause the reservation management device 102 to perform actions, such as to transmit, receive, or otherwise process network messages and requests, for example, and to perform other actions described and illustrated below with reference to FIGS. 3-10. The application(s) can be implemented as components of other applications, operating system extensions, and/or plugins, for example.

Further, the application(s) may be operative in a cloud-based computing environment with access provided via a software-as-a-service model. The application(s) can be executed within or as virtual machine(s) or virtual server(s) that may be managed in a cloud-based computing environment. Also, the application(s), and even the reservation management device 102 itself, may be located in virtual server(s) running in a cloud-based computing environment rather than being tied to specific physical network computing devices. Also, the application(s) may be running in virtual machines (VMs) executing on the reservation management device 102 and managed or supervised by a hypervisor.

In this particular example, the memory 202 includes a user database 208 and a workspace database 210. The user database 208 stores user data received from the client devices 106(1)-106(n) via the reservation applications 112(1)-112(n) executing thereon, such as identification data, login credentials, an indication of an associated organization, and/or user preference data (e.g., a willingness to travel within a specified radius for meetings), for example. The workspace database stores workspace data obtained from the workspace host device 108(1)-108(n), such as size, availability data, amenities, and/or cost, for example. Other information can be stored in one or more of the user database 208 or the workspace database 210 in other examples, and other data stores and/or applications or modules also can be hosted by the reservation management device 102 in other examples.

The communication interface 204 of the reservation management device 102 operatively couples and communicates between the reservation management device 102, client devices 106(1)-106(n), workspace host devices 108(1)-108(n) and web servers 110(1)-110(n), which are coupled together at least in part by the communication network(s) 104(1) and 104(2), although other types or numbers of communication networks or systems with other types or numbers of connections or configurations to other devices or elements can also be used.

By way of example only, the communication network(s) 104(1) and 104(2) can include local area network(s) (LAN(s)) or wide area network(s) (WAN(s)), and can use TCP/IP over Ethernet and industry-standard protocols, although other types or numbers of protocols or communication networks can be used. The communication network(s) 104(1) and 104(2) in this example can employ any suitable interface mechanisms and network communication technologies including, for example, Ethernet-based Packet Data Networks (PDNs).

While the reservation management device 102 is illustrated in this example as including a single device, the reservation management device 102 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the reservation management device 102. Additionally, one or more of the devices that together comprise the reservation management device 102 in other examples can be stand-alone devices or integrated with one or more other devices or apparatuses.

Each of the client devices 106(1)-106(n) of the network environment 100 in this example includes any type of computing device that can exchange network data, such as mobile, desktop, laptop, or tablet computing devices, virtual machines (including cloud-based computers), or the like. Each of the client devices 106(1)-106(n) in this example includes a processor, a memory, and a communication interface, which are coupled together by a bus or other communication link (not illustrated), although other numbers or types of components could also be used.

Each of the client devices 106(1)-106(n) may run interface applications, such as standard web browsers or the standalone reservation applications 112(1)-112(n), which may provide an interface to communicate with the reservation management device 102 via the communication network(s) 104(1). Each of the client devices 106(1)-106(n) may further include a display device, such as a display screen or touchscreen, or an input device, such as a keyboard or mouse, for example (not illustrated).

Each of the workspace host devices 108(1)-108(n) of the network environment 100 in this example includes any type of computing device that can exchange network data, such as mobile, desktop, laptop, or tablet computing devices, virtual machines (including cloud-based computers), or the like. Each of the workspace host devices 108(1)-108(n) in this example includes a processor, a memory, and a communication interface, which are coupled together by a bus or other communication link (not illustrated), although other numbers or types of components could also be used.

Each of the workspace host devices 108(1)-108(n) may run interface applications, such as standard web browsers or standalone applications, which may provide an interface to communicate with the reservation management device 102 via the communication network(s) 104(1). Each of the workspace host devices 108(1)-108(n) may further include a display device, such as a display screen or touchscreen, or an input device, such as a keyboard or mouse, for example (not illustrated).

Each of the web servers 110(1)-110(n) in this example includes one or more processors, a memory, and a communication interface, which are coupled together by a bus or other communication link, although other numbers and types of network devices could be used. The web servers 110(1)-110(n) in this example process requests (e.g., API requests) received from the reservation management device 102 related to hosted content or services via the communication network(s) 104(2) according to the HTTP-based application RFC protocol, for example. Various applications may be operating on the web servers 110(1)-110(n) and transmitting data (e.g., files or web pages) to the reservation management device 102. The web servers 110(1)-110(n) may be hardware or software or may represent a system with multiple servers in a pool, which may include internal or external networks.

Although the web servers 110(1)-110(n) are illustrated as single devices, one or more actions of each of the web servers 110(1)-110(n) may be distributed across one or more distinct network computing devices that together comprise one or more of the web servers 110(1)-110(n). Moreover, the web servers 110(1)-110(n) are not limited to a particular configuration. Thus, the web servers 110(1)-110(n) may contain a plurality of network computing devices that operate using a master/slave approach, whereby one of the network computing devices of the web servers 110(1)-110(n) operate to manage and/or otherwise coordinate operations of the other network computing devices. The web servers 110(1)-110(n) may operate as a plurality of network computing devices within a cluster architecture, a peer-to peer architecture, virtual machines, or within a cloud architecture, for example.

Although the exemplary network environment 100 with the client devices 106(1)-106(n), workspace host devices 108(1)-108(n), reservation management device 102, web servers 110(1)-110(n), and communication network(s) 104(1) and 104(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the client devices 106(1)-106(n), reservation management device 102, workspace host devices 108(1)-108(n), or web servers 110(1)-110(n), for example, may be configured to operate as virtual instances on the same physical machine. In other words, one or more of the client devices 106(1)-106(n), workspace host devices 108(1)-108(n), reservation management device 102, or web servers 110(1)-110(n) may operate on the same physical device rather than as separate devices communicating through communication network(s) 104(1) or 104(2). Additionally, there may be more or fewer client devices, workspace host devices, reservation management devices, or web servers than illustrated in FIG. 1.

The examples of this technology may also be embodied as one or more non-transitory computer readable media having instructions stored thereon, such as in the memory 202, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that are described and illustrated herein.

Referring to FIG. 3, a flowchart of an exemplary method for managing workspace reservations is illustrated. In step 300 in this example, the reservation management device 102 determines whether a request to onboard a new workspace has been received from one of the workspace host devices 108(1)-108(n). The request can be received via a mobile application executing on the workspace host devices 108(1)-108(n) or an interface (e.g., web page) provided by the reservation management device 102, for example. If the reservation management device 102 determines that a request to onboard a new workspace has been received, then the Yes branch is taken to step 302.

In step 302, the reservation management device 102 obtains and stores workspace data including a geolocation (e.g., latitude/longitude coordinates or a street address) for the workspace and availability data for the workspace. The workspace data can be stored in the workspace database 210 optionally in association with a generated unique identifier for the workspace. The workspace data can include information regarding the workspace to be made available for reservation, such as amenities, size, handicap accessibility, cost, and/or type (e.g., conference room, common area, or auditorium).

The availability data can indicate particular available dates/times and/or day of the week or date/time ranges, for example. Other information can also be included in the workspace data in other examples. While new workspaces are explicitly onboarded in this example, in other examples the reservation management device 102 can link or interface directly with an internal reservation system (e.g., an enterprise scheduling system) for one or more portions of the workspace data (e.g., the availability data) for any number of workspace hosts. Subsequent to obtaining and storing the workspace data, or if the reservation management device 102 determines a request to onboard a new workspace has not been received and the No branch is taken from step 300, then the reservation management device 102 proceeds to step 304.

In step 304, the reservation management device 102 determines whether a request to onboard a new user has been received from one of the client devices 106(1)-106(n). In one example, a user of one of the client devices 106(1)-106(n) can download the reservation application 112(1)-112(n) and submit a request for login credentials via the downloaded reservation application 112(1)-112(n). In other examples, the request to onboard a new user can be generated by a separate enterprise device (e.g., an access management device) during onboarding for all new employees. Other methods of generating the request to onboard a new user can also be used in other examples. If the reservation management device 102 determines that a request to onboard a new user has been received, then the Yes branch is taken to step 306.

In step 306, the reservation management device 102 obtains and stores user data including identification data and optional preference data in the user database 208. The identification data can include an employee ID, name, or any other unique identifier for the user and the preference data can include an indication of a maximum radius or travel time that is acceptable to the user to join a meeting, for example. The user data can also include an indication of an associated organization, a role of the user in the organization, and/or any other information about the user. Subsequent to obtaining and storing the user data, or if the reservation management device 102 determines a request to onboard a new user has not been received and the No branch is taken from step 304, then the reservation management device 102 proceeds to step 308.

In step 308, the reservation management device 102 determines whether a login request has been received from a user of one of the client devices 106(1)-106(n), which can be the newly-added user in step 306 or another previously-enrolled user. Accordingly, the login request can be received via one of the reservation applications 112(1)-112(n) in some examples. If the reservation management device 102 determines that a login request has not been received then the No branch is taken back to step 300. Accordingly, the reservation management device 102 effectively waits for a request to onboard a new workspace or a new user, or for a login request. If the reservation management device 102 determines that a login request has been received, then the Yes branch is taken to step 310.

In step 310, the reservation management device 102 obtains workspace parameter(s) for a meeting after authenticating the user of the one of the client devices 106(1)-106(n) from which the login request was received. The user can be authenticated based on login credentials stored in the user database 208 in step 306, for example, although other authentication methods (e.g., single sign-in (SSO)) can also be used. Additionally, the workspace parameter(s) can be obtained via a workspace parameter interface 400 generated by the reservation management device 102 and provided to the one of the client devices 106(1)-106(n) (e.g., via one of the reservation applications 112(1)-112(n)).

The workspace parameter(s) can be any characteristic of a physical workspace that is a requirement for the meeting as established by the meeting host, which is the authenticated user in this example. Exemplary workspace parameter(s) can include amenities (e.g., WiFi service, cafe in the same building, free parking, projector, whiteboard, voice/video communications, etc.), accessibility requirements (e.g., handicap accessibility, ground floor access, etc.), size (e.g., physical size, seating, number of desks/conference tables, etc.), or type of workspace (e.g., private conference room, public common area, etc.), and any other workspace parameter(s) can also be used in other examples.

Figure 4:
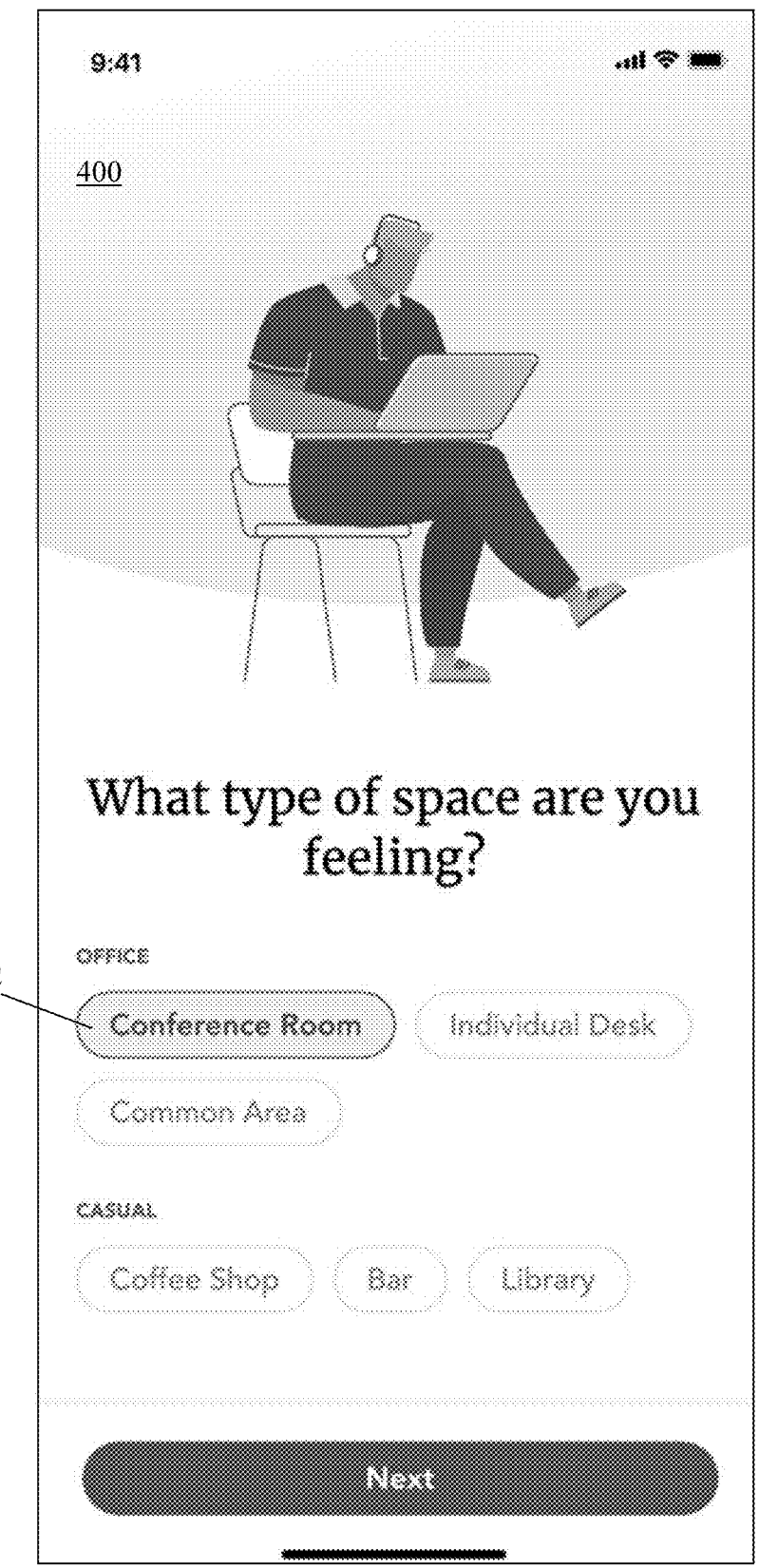
FIG. 4 is an exemplary workspace parameter interface.

Referring to FIG. 4, an exemplary workspace parameter interface 400 is illustrated. In this example, a user of the one of the client devices 106(1)-106(n) can input a type workspace parameter via a workspace type button 402, but any other number or type of workspace parameter(s) can be specified by the user of the one of the client devices 106(1)-106(n) that is interfacing with the reservation management device 102 to establish a meeting.

Referring back to FIG. 3, in step 312, the reservation management device 102 obtains an indication (e.g., name or other unique identifier) from the one of the client devices 106(1)-106(n) of other user(s) to be included in the meeting, which are referred to herein as registered users. The registered users are previously registered with the reservation management device 102 and can be previously-connected to the user of the one of the client devices 106(1)-106(n) via an internal network (e.g., with user links maintained in the user database 208) and/or external network (e.g., a public social media network or enterprise network), for example. In other examples, the other user(s) can be selected from a subset of the user data in the user database 208 that corresponds with users associated with a same organization as the authenticated user of the one of the client devices 106(1)-106(n). In some examples, the indication of the other user(s) can be obtained via a collaboration interface 500 generated by the reservation management device 102 and provided to the one of the client devices 106(1)-106(n) (e.g., via one of the reservation applications 112(1)-112(n)).

Figure 5:
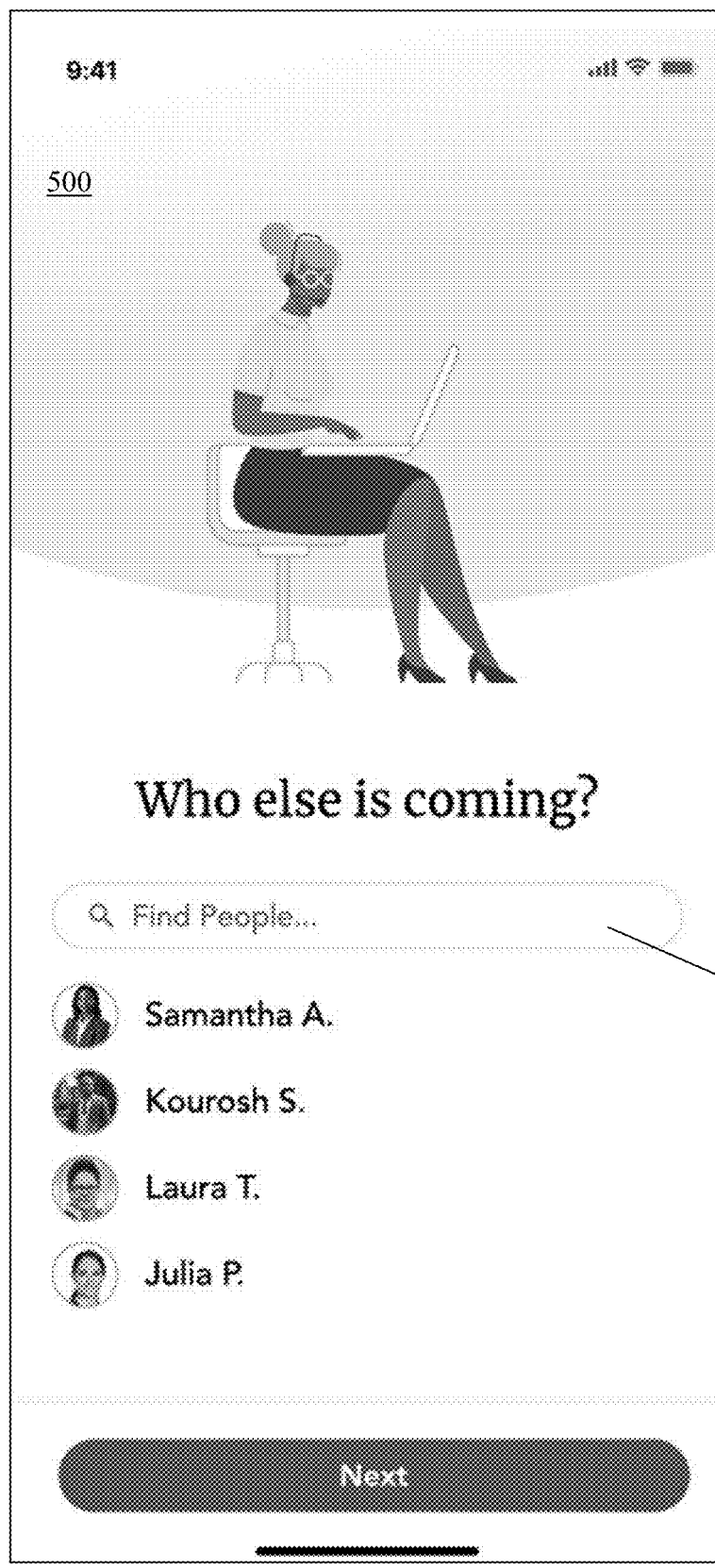
FIG. 5 is an exemplary collaboration interface.

Referring to FIG. 5, an exemplary collaboration interface 500 is illustrated. In this example, a search input field 502 is included in the collaboration interface 500 that can facilitate searching by name. In other examples, other selection or filtering criteria can be used, such as a user role or a current user geolocation, for example. In yet other examples, other methods of facilitating identification of other user(s) to be included in the meeting can be used.

With the indication of the other user(s) to be included in the meeting obtained in step 310, the reservation management device 102 then determines geolocations of the authenticated user hosting or establishing the meeting and the other user(s). The user geolocations can be determined by pinging the one of the client devices 106(1)-106(n) and other of the client devices 106(1)-106(n), associated with the indicated or selected registered users and executing one of the reservation applications 112(1)-112(n), to obtain the geolocation via a global positioning system (GPS) service executing on the client devices 106(1)-106(n). The other of the client devices 106(1)-106(n) can be identified to facilitate a ping based on a correlation in the user database 208 of the indications obtained in step 312 with unique identifiers (e.g., IP addresses) of the other of the client devices 106(1)-106(n) obtained and stored in step 306 and/or via the reservation applications 112(1)-112(n) executing thereon.

In step 314, the reservation management device 102 correlates user and workspace geolocations to identify an initial set of workspaces for which workspace data is stored in the workspace database 210. The initial set of workspaces can be generated based on default criteria such as no more than twenty miles from the current geolocation of any one of the users to be included in the meeting. Other methods for generating the initial set of workspaces can also be used.

Figure 6:
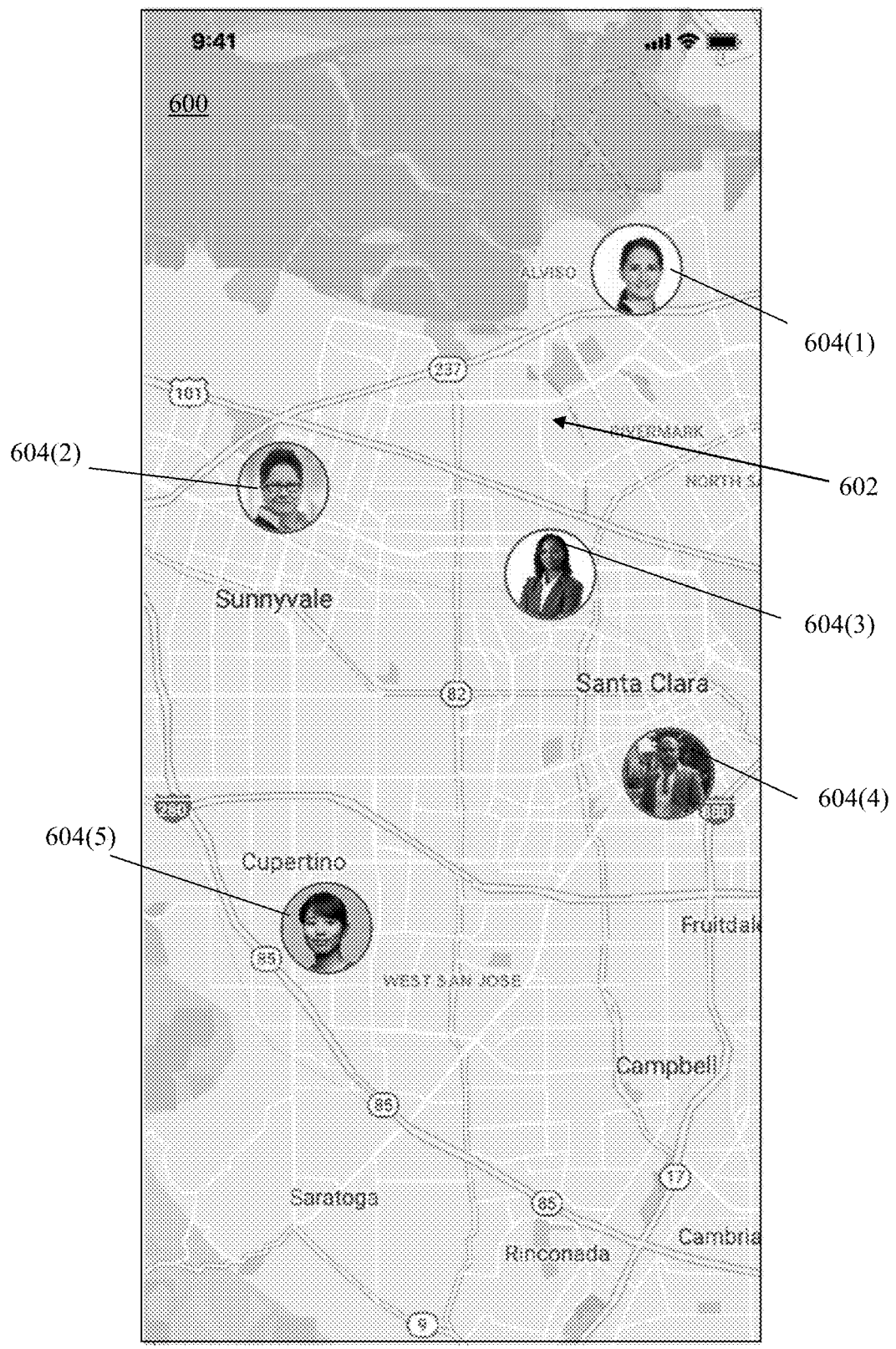
FIG. 6 is an exemplary user location interface.

Referring to FIG. 6, an exemplary user location interface 600 is illustrated. The user location interface 600 is optionally generated and provided by the reservation management device 102 (e.g., via one of the reservation applications 112(1)-112(n)) to graphically show the authenticated user the general or high level location of each of the registered users to be included in the meeting. In some examples, the granularity of the user location interface is limited for security purposes. In this particular example, the user location interface 600 includes a map 602 with an overlay of user images 604(1)-604(5) disposed proximate their corresponding geolocations on the map 604, although other types of information can be included in the optional user location interface 600 in other examples.

Referring back to FIG. 3, in step 316, the reservation management device 102 filters the workspaces identified in the initial set of workspaces in step 314 based on the workspace data and workspace geolocations to identify a subset of the initial set of workspaces that satisfy the workspace parameter(s) and user preference data. For example, the reservation management device 102 can filter the workspaces based on workspace data that indicates that a workspace is not large enough to host the number of users identified in step 312.

In another example, the reservation management device 102 may filter the workspaces based on a restriction in the user preference data for one of the registered users to be included in the meeting that the other user will not travel more than a specified distance from the other user's current location. In yet another examples, the reservation management device 102 can filter the workspaces based on workspace data indicating stairs are required to access the workspace and a workspace parameter indicating that the workspace must be handicap accessible. Any other number or type of filtering criteria can be applied in step 316 to determine the subset of the workspaces.

Figure 7:
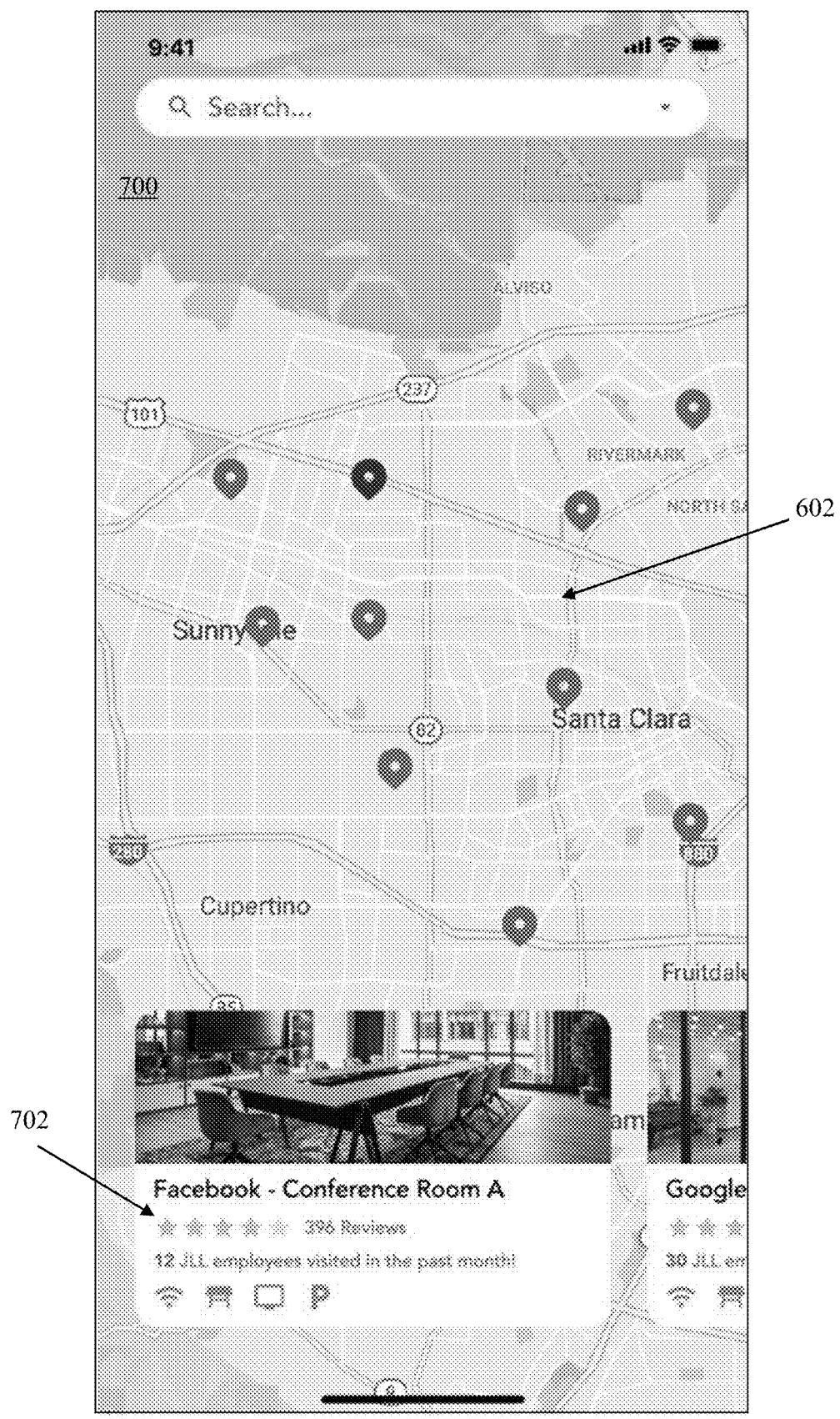
FIG. 7 is an exemplary workspace location interface.

Referring to FIG. 7, an exemplary workspace location interface 700 is illustrated. The reservation management device 102 can generate and provide the workspace location interface 700 in this example (e.g., via one of the reservation applications 112(1)-112(n)) to facilitate viewing of the geolocations of the subset of the workspaces graphically on the map 602. The geolocations can be retrieved from the workspace database 210 for generating the workspace location interface 700. Optionally, the user geolocations illustrated in FIG. 6 can be provided on the workspace location interface 700 via an overlay in some examples.

With the workspace location interface, the authenticated user of the one of the client devices 106(1)-106(n) can scroll through a workspace listing 700 of possible workspaces that may be available to satisfy the various requirements for the meeting the authenticated user intends to host. Optionally, the workspace location interface 700 can include a preview of the subset of the workspaces that includes a portion of the workspace data (e.g., amenities, an image, or review summary) retrieved from the workspace database 210.

Referring back to FIG. 3, in step 318, the reservation management device 102 receives a selection of one of the subset of the workspaces from the one of the client devices 106(1)-106(n). In some examples, the selection can be made via a workspace selection interface 800 generated and provided by the reservation management device 102 (e.g., via one of the reservation applications 112(1)-112(n)) following selection of one of the previews provided in the listing 702 of the workspace location interface 700.

Figure 8:
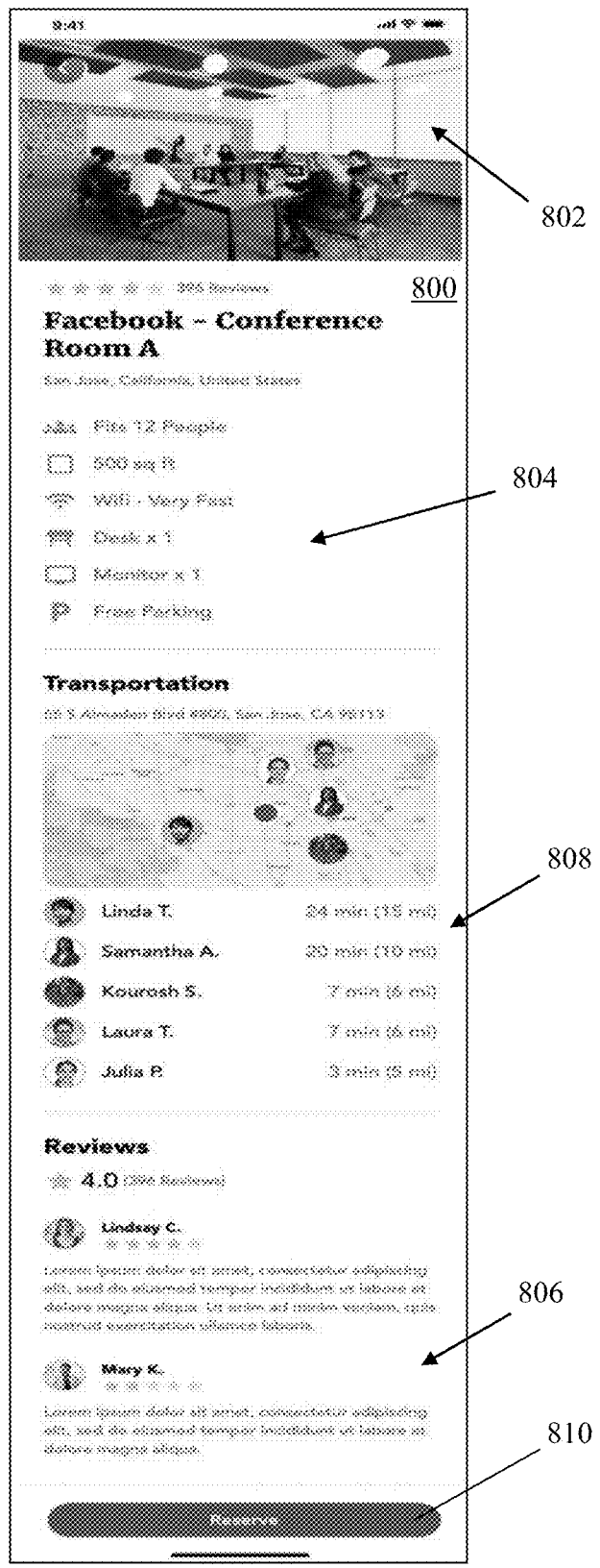
FIG. 8 is an exemplary workspace selection interface.

Referring to FIG. 8, an exemplary workspace selection interface 800 is illustrated. In this example, the workspace selection interface 800 provides more of the workspace data for a workspace in the subset of workspaces than the preview of the listing 702 of the workspace location interface 700. In this particular example, the reservation management device 102 includes workspace image(s) 802, an amenities listing 804 determined from the stored workspace data, and workspace reviews 806, which can be retrieved from the workspace data or obtained from one or more of the web servers 110(1)-110(n), for example.

The reservation management device 102 in this example also determines, and graphically outputs, an estimated travel time 808 for each of the registered users to be included in the meeting. In one example, the estimated travel times 808 are determined via an application programming interface (API) request to a third party service hosted by one of the web servers 110(1)-110(n) (e.g., the Google Maps Platform) that includes the workspace geolocation retrieved from the workspace database 210 and user geolocations for the registered users determined in step 312. The workspace selection interface 800 also includes a reserve button 810 in this example that, when selected by the authenticated user of the one of the client devices 106(1)-106(n), generates the selection received by the reservation management device 102 in step 318 of FIG. 3.

In step 320, the reservation management device 102 receives a reservation request based on availability of the selected workspace corresponding to the selection received in step 318. The availability can be determined based on the availability data stored in the workspace database 210 and correlated with a unique identifier for the workspace received with the selection in step 318, for example. The reservation request can be received via a reservation interface 900 generated by the reservation management device 102 and provided to the one of the client devices 106(1)-106(n) (e.g., via one of the reservation applications 112(1)-112(n)) in some examples.

Figure 9:
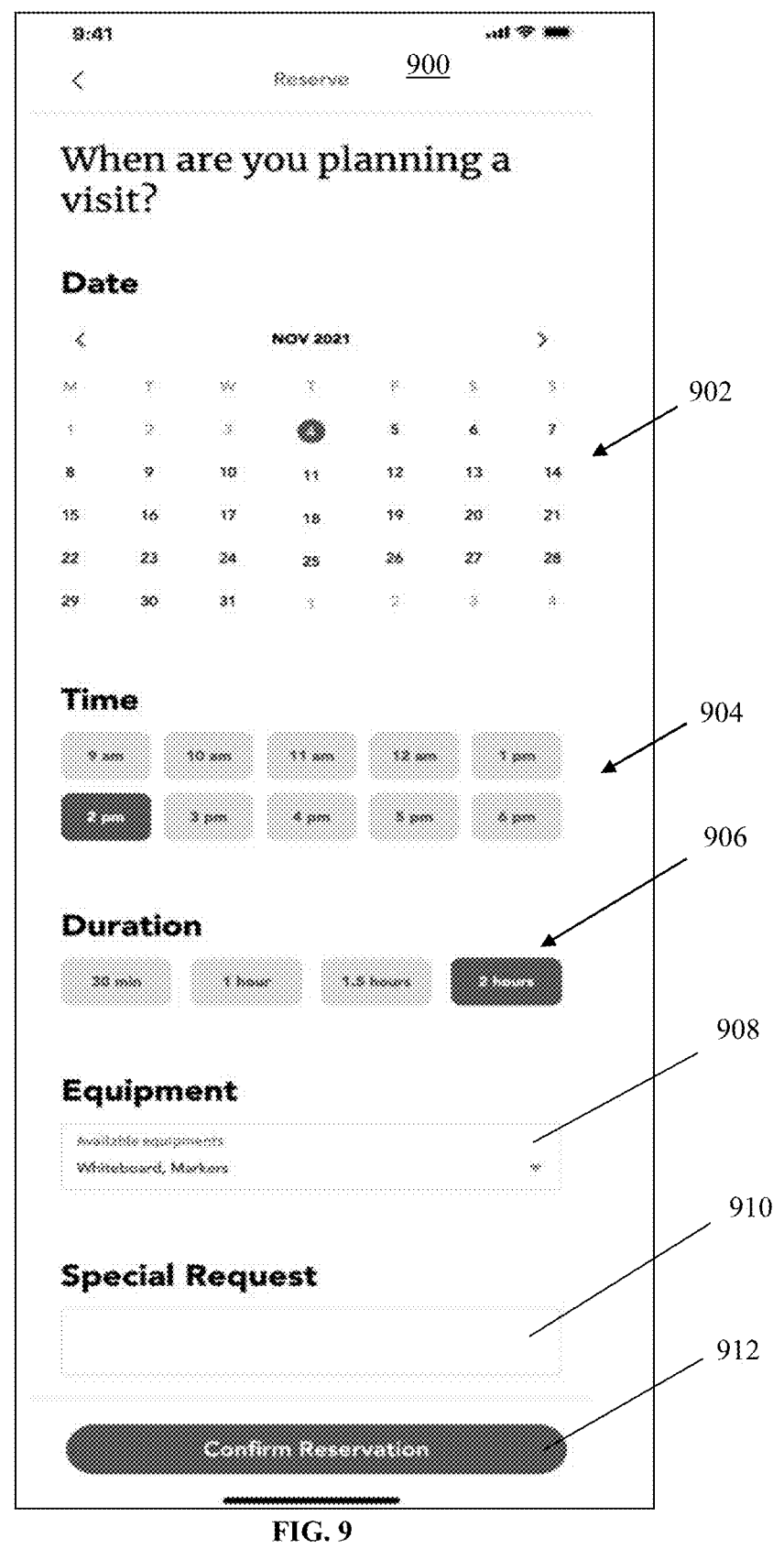

Referring to FIG. 9, an exemplary reservation interface 900 is illustrated. In this example, the reservation interface 900 is generated to include selectable time windows determined from the availability data for the workspace. Accordingly, the reservation interface 900 allows a user to select a date 902, time 904, and duration 906, along with equipment 908 required to be present and any special requests 908. Upon inputting the various selections and interfacing with the confirm reservation button 912, the reservation interface 900 initiates the reservation request received by the reservation management device 102 in step 320.

In step 322, the reservation management device 102 updates the stored availability data for the selected workspace based on a time window (e.g., date, time, and/or duration) selected by the authenticated user of the one of the client devices 106(1)-106(n) and optionally indicated in the reservation request received in step 320. The reservation management device 102 can automatically send digital calendar invitations (e.g., via a push notification and the corresponding reservation applications 112(1)-112(n)) to those of the client devices 106(1)-106(n) associated with the registered users to be included in the meeting.

Additionally, the reservation management device 102 can receive a request to calendar the meeting from the authenticated user of the one of the client devices 106(1)-106(n) that is hosting the meeting, which in some examples causes the reservation management device 102 to generate a digital calendar invitation for the authenticated user or automatically update a stored calendar in examples in which the reservation management device 102 is authorized by the authenticated user to do so. Other methods for processing requests to calendar the meeting can also be used in other examples.

Figure 10:
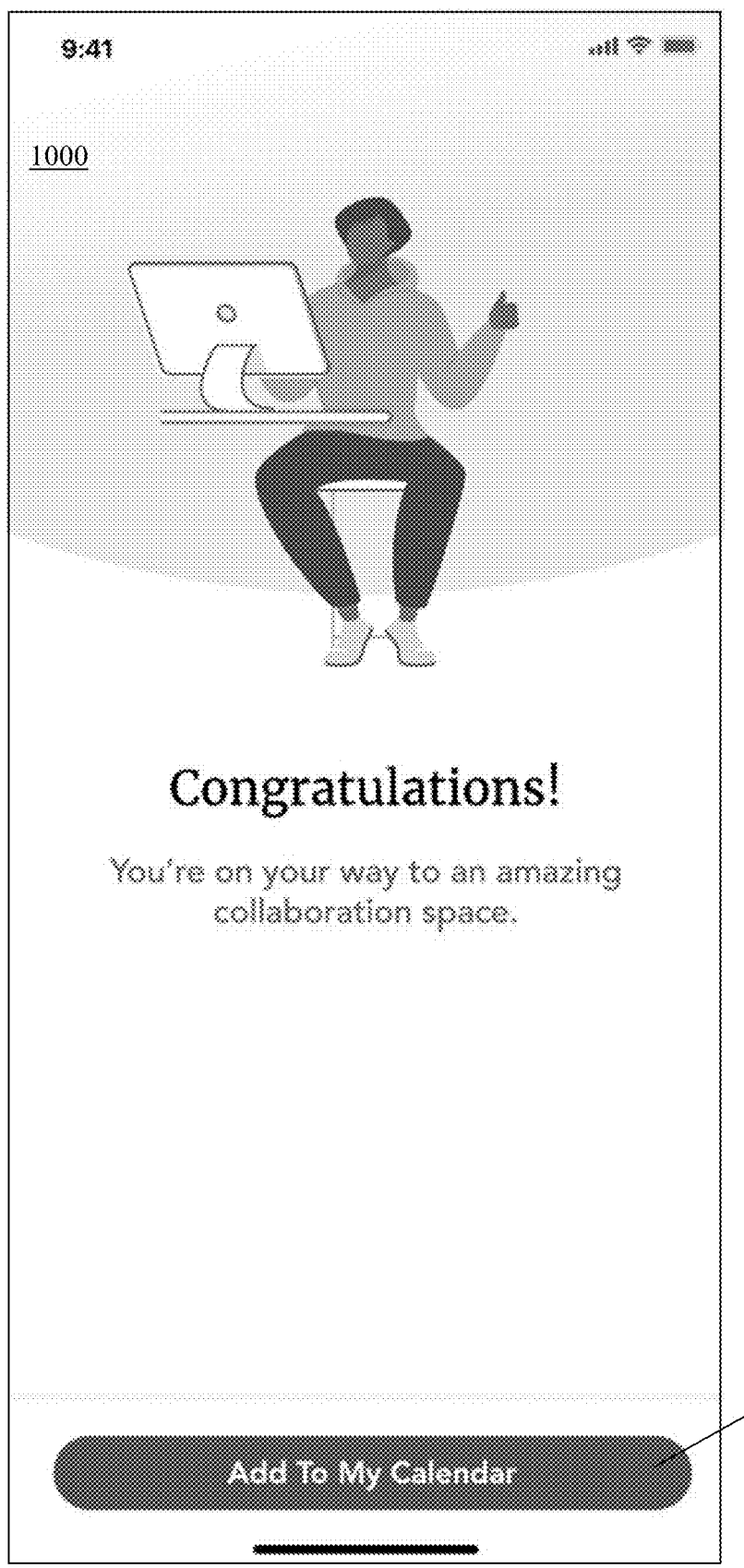
FIG. 10 is an exemplary scheduling interface.

Referring to FIG. 10, an exemplary scheduling interface 1000 is illustrated. In this example, the reservation management device 102 generates and provides the scheduling interface 100 to the one of the client devices 106(1)-106(n) to allow the authenticated user hosting the meeting to request that the meeting be added to the user's calendar via interaction with an add to my calendar button 1002. Other information and/or functionality can also be provided via the scheduling interface 1000 in other examples.

As described and illustrated by way of the examples herein, this technology provides an improved reservation management device that more efficiently hosts and reserves workspaces for collaborative meetings. This technology obtains and correlates workspace and user geolocations to generate an optimized set of workspaces available for reservation by a meeting host. Accordingly, this technology reduces travel time for in-person collaboration and provides flexibility for physical workspace owners and managers to facilitate optimized workspace utilization.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for real-time workspace reservations, the method implemented by one or more reservation management devices and comprising:

receiving a selection of a plurality of users registered with the reservation management device from a user of a first mobile device and via a graphical collaboration interface provided to the first mobile device via one or more communication networks, wherein each of the registered users is associated with one of a plurality of other mobile devices;

pinging a reservation application executing on each of the first mobile device and the other mobile devices associated with the selected registered users to determine, via a global positioning system (GPS) service provided by each of the first mobile device and the other mobile devices, a current geolocation for each of the first mobile device and the other mobile devices;

correlating the current geolocations and workspace geolocations for a plurality of workspaces to identify a subset of the workspaces determined to satisfy one or more workspace parameters based on workspace data for the workspaces retrieved via the communication networks from a workspace database of a workspace host device, wherein the workspace parameters are obtained from the first mobile device after authenticating the user and the workspace data comprises at least availability data;

generating, and providing to the first mobile device via the communication networks, a graphical workspace location interface comprising a map comprising the workspace geolocations for the subset of the workspaces, an overlay comprising the current geolocations, and a listing comprising previews generated based on the workspace data for the subset of the workspaces;

receiving from the first mobile device a selection by the authenticated user of one of the subset of the workspaces via the graphical workspace selection interface provided to the first mobile device via the communication networks after receiving from the first mobile device another selection by the authenticated user of one of the previews corresponding to the selected one of the subset of the workspaces;

updating in the workspace database the availability data for the selected one of the subset of the workspaces based on a time window received from the first mobile device via a graphical reservation interface provided to the first mobile device via the communication networks; and generating based on the received time window, and providing via the communication networks to the first mobile device and the other mobile devices, a digital calendar invitation for a meeting at the selected one of the subset of the workspaces and between the authenticated user and the selected registered users.

2. The method of claim 1, further comprising determining an estimated travel time for each of the selected registered users to each of the subset of the workspaces by providing the current geolocations for the other mobile devices and the workspace geolocations for the subset of the workspaces to a third party application programming interface (API).

3. The method of claim 2, wherein the graphical workspace selection interface comprises the estimated travel time for each of the registered users and a portion of the workspace data for the subset of the workspaces.

4. The method of claim 1, wherein registered users are associated in a stored user database with a same organization as the authenticated user, and the workspaces are further determined to satisfy stored user preference data for the authenticated user and the registered users.

5. The method of claim 1, wherein the graphical reservation interface comprises a portion of the availability data for the selected one of the subset of the workspaces.

6. A reservation management device, comprising memory comprising programmed instructions stored thereon and one or more processors configured to execute the stored programmed instructions to:
receive a selection of a plurality of users registered with the reservation management device from a user of a first mobile device and via a graphical collaboration interface provided to the first mobile device via one or more communication networks, wherein each of the registered users is associated with one of a plurality of other mobile devices;
ping a reservation application executing on each of the first mobile device and the other mobile devices associated with the selected registered users to determine, via a global positioning system (GPS) service provided by each of the first mobile device and the other mobile devices, a current geolocation for each of the first mobile device and the other mobile devices;
correlate the current geolocations and workspace geolocations for a plurality of workspaces to identify a subset of the workspaces determined to satisfy one or more workspace parameters based on workspace data for the workspaces retrieved via the communication networks from a workspace database of a workspace host device, wherein the workspace parameters are obtained from the first mobile device after authenticating the user and the workspace data comprises at least availability data;
generate, and provide to the first mobile device via the communication networks, a graphical workspace location interface comprising a map comprising the workspace geolocations for the subset of the workspaces, an overlay comprising the current geolocations, and a listing comprising previews generated based on the workspace data for the subset of the workspaces;
receive from the first mobile device a selection by the authenticated user of one of the subset of the workspaces via the graphical workspace selection interface provided to the first mobile device via the communication networks after receiving from the first mobile device another selection by the authenticated user of one of the previews corresponding to the selected one of the subset of the workspaces;
update in the workspace database the availability data for the selected one of the subset of the workspaces based on a time window received from the first mobile device via a graphical reservation interface provided to the first mobile device via the communication networks; and
generate based on the received time window, and provide via the communication networks to the first mobile device and the other mobile devices, a digital calendar invitation for a meeting at the selected one of the subset of the workspaces and between the authenticated user and the registered users.

7. The reservation management device of claim 6, wherein the processors are further configured to execute the stored programmed instructions to determine an estimated travel time for each of the selected registered users to each of the subset of the workspaces by providing the current geolocations for the other mobile devices and the workspace geolocations for the subset of the workspaces to a third party application programming interface (API).

8. The reservation management device of claim 7, wherein the graphical workspace selection interface comprises the estimated travel time for each of the registered users and a portion of the workspace data for the subset of the workspaces.

9. The reservation management device of claim 6, wherein registered users are associated in a stored user database with a same organization as the authenticated user, and the workspaces are further determined to satisfy stored user preference data for the authenticated user and the registered users.

10. The reservation management device of claim 6, wherein the graphical reservation interface comprises a portion of the availability data for the selected one of the subset of the workspaces.

11. A non-transitory computer readable medium having stored thereon instructions for real-time workspace reservations comprising executable code which when executed by one or more processors of a reservation management device, causes the processors to:
receive a selection of a plurality of users registered with the reservation management device from a user of a first mobile device and via a graphical collaboration interface provided to the first mobile device via one or more communication networks, wherein each of the registered users is associated with one of a plurality of other mobile devices;
ping a reservation application executing on each of the first mobile device and the other mobile devices associated with the selected registered users to determine, via a global positioning system (GPS) service provided by each of the first mobile device and the other mobile devices, a current geolocation for each of the first mobile device and the other mobile devices;
correlate the current geolocations and workspace geolocations for a plurality of workspaces to identify a subset of the workspaces determined to satisfy one or more workspace parameters based on workspace data for the workspaces retrieved via the communication networks from a workspace database of a workspace host device, wherein the workspace parameters are obtained from the first mobile device after authenticating the user and the workspace data comprises at least availability data;
generate, and provide to the first mobile device via the communication networks, a graphical workspace location interface comprising a map comprising the workspace geolocations for the subset of the workspaces, an overlay comprising the current geolocations, and a listing comprising previews generated based on the workspace data for the subset of the workspaces;
receive from the first mobile device a selection by the authenticated user of one of the subset of the workspaces via the graphical workspace selection interface provided to the first mobile device via the communication networks after receiving from the first mobile device another selection by the authenticated user of one of the previews corresponding to the selected one of the subset of the workspaces;

update in the workspace database the availability data for the selected one of the subset of the workspaces based on a time window received from the first mobile device via a graphical reservation interface provided to the first mobile device via the communication networks; and generate based on the received time window, and provide via the communication networks to the first mobile device and the other mobile devices, a digital calendar invitation for a meeting at the selected one of the subset of the workspaces and between the authenticated user and the registered users.

12. The non-transitory computer readable medium of claim 11, wherein the executable code when executed by the processors further causes the processors to determine an estimated travel time for each of the selected registered users to each of the subset of the workspaces by providing the current geolocations for the other mobile devices and the workspace geolocations for the subset of the workspaces to a third party application programming interface (API).

13. The non-transitory computer readable medium of claim 12, wherein the graphical workspace selection interface comprises the estimated travel time for each of the registered users and a portion of the workspace data for the subset of the workspaces.

14. The non-transitory computer readable medium of claim 11, wherein registered users are associated in a stored user database with a same organization as the authenticated user, and the workspaces are further determined to satisfy stored user preference data for the authenticated user and the registered users.

15. The non-transitory computer readable medium of claim 11, wherein the graphical reservation interface comprises a portion of the availability data for the selected one of the subset of the workspaces.

* * * * *